（12） United States Patent
Pinteau et al.

(10) Patent No.: US 9,032,932 B2
(45) Date of Patent: May 19, 2015

(54) METHOD FOR ADAPTING AN ENGINE TO THE FUEL GRADE BY INCREMENTING THE INITIAL OCTANE NUMBER OF THE FUEL

(75) Inventors: Franck Pinteau, Chaville (FR); Edouard Valenciennes, Paris (FR)

(73) Assignee: RENAULT S.A.S, Boulogne-Billancourt (FR)

( * ) Notice: Subject to any disclaimer, the term of this patent is extended or adjusted under 35 U.S.C. 154(b) by 802 days.

(21) Appl. No.: 13/266,837

(22) PCT Filed: Mar. 8, 2010

(86) PCT No.: PCT/FR2010/050389
§ 371 (c)(1),
(2), (4) Date: Apr. 12, 2012

(87) PCT Pub. No.: WO2010/125260
PCT Pub. Date: Nov. 4, 2010

(65) Prior Publication Data
US 2012/0186556 A1 Jul. 26, 2012

(30) Foreign Application Priority Data

Apr. 30, 2009 (FR) ...................................... 09 52885

(51) Int. Cl.
*F02P 5/00* (2006.01)
*F02P 5/152* (2006.01)

(52) U.S. Cl.
CPC ............ *F02P 5/1527* (2013.01); *F02P 5/1523* (2013.01); *Y02T 10/46* (2013.01)

(58) Field of Classification Search
CPC ........ G01L 23/225; F02D 37/02; F02P 5/152; F02P 5/1527
USPC .................................................... 123/406.34
See application file for complete search history.

(56) References Cited

U.S. PATENT DOCUMENTS

| 4,903,663 | A | * | 2/1990 | Ooki et al. | ............... | 123/406.32 |
| 4,934,327 | A | * | 6/1990 | Hidaka | ..................... | 123/406.32 |

(Continued)

FOREIGN PATENT DOCUMENTS

| DE | 40 01 474 | 8/1991 |
| EP | 0 311 097 | 4/1989 |
| EP | 0 576 516 | 1/1994 |

OTHER PUBLICATIONS

U.S. Appl. No. 13/266,802, filed Oct. 28, 2011, Pinteau, et al.

(Continued)

*Primary Examiner* — Lindsay M. Low
*Assistant Examiner* — Josh Campbell
(74) *Attorney, Agent, or Firm* — Oblon, McClelland, Maier & Neustadt, L.L.P.

(57) ABSTRACT

A method for adapting an engine to an octane number of fuel by incrementing an initial octane number. Starting with a reference setting of a spark advance in an engine operating range for a given octane number, the engine operating range being divided into a plurality of zones, each including an anti-pinging corrective value of the spark advance of the reference setting, the engine is switched to a reference setting that corresponds to a higher octane number: when a top dead center counter, incremented if the advance correction in the current zone is lower than a predetermined threshold, exceeds a predetermined threshold, or when a counter of the number of the zones in which the advance correction loop is lower than another threshold value, exceeds a multi-zone threshold.

10 Claims, 3 Drawing Sheets

(56) References Cited

U.S. PATENT DOCUMENTS 5,131,369 A * 7/1992 Kanehiro et al. ........ 123/406.32
5,845,620 A * 12/1998 Miyashita et al. ......... 123/406.3

OTHER PUBLICATIONS

International Search Report Issued Sep. 7, 2010 in PCT/FR10/050389 Filed Mar. 8, 2010.

* cited by examiner

METHOD FOR ADAPTING AN ENGINE TO THE FUEL GRADE BY INCREMENTING THE INITIAL OCTANE NUMBER OF THE FUEL

BACKGROUND

1. Field of the Invention

The invention relates to a method of adapting the engine to the octane number of the fuel. This invention notably relates to controlled-ignition engines the ignition advance of which can be controlled electronically. More particularly, the invention relates to a method of adaptation by incrementing the learned octane number of the fuel.

2. Description of Related Art

At the present time there are various types of fuel that have different characteristics. These characteristics include the octane number. Among the various fuels, the octane number may commonly adopt the approximate values of 98, 95, 91 and 87. Fuels with octane numbers of 98 and 95 are often used in Western Europe, those with an octane number of 91 may be encountered in the United States and those with an octane number of 87 are used, for example, in Iran.

In order to optimize the compromise between performance, fuel consumption and reliability, it is desirable to have an engine setting, and notably the ignition advance setting, that is adapted to suit each octane number.

When the ignition advance setting is defined for one octane number and the fuel used has a different octane number, notably when changing geographical zone, the engine may operate unsatisfactorily. It may, for example, begin to ping, particularly if the engine is optimized for a fuel that has a higher octane number than the fuel being used, or alternatively the capability of the engine may not be best optimized if the fuel being used has an octane number lower than that for which the engine is set up.

Pinging may notably be due to a phenomenon of abnormal combustion involving detonation that notably generates a significant heat transfer liable to damage the combustion chamber. Pinging may arise somewhat randomly under certain operating conditions, notably when the octane number of the fuel is not suited to the engine setting.

Techniques for correcting pinging include the anti-pinging correction explained hereinbelow. This is essentially used when the discrepancies are small. This correction, which is curative, is unable satisfactorily to correct the effects of pinging when the difference in octane number is too great.

This known anti-pinging correction involves two types of action:
- a rapid correction, also known as a fast loop (BR) correction, which greatly reduces the ignition advance, and
- a slow correction, also known as a slow loop (BL) correction, which reduces the ignition advance less significantly.

Thus, for example, when pinging is detected at a time t, the fast loop (BR) and the slow loop (BL) are activated in order to obtain a correction value of X° by which the ignition advance needs to be corrected in order to eliminate pinging.

At a time t+1, if pinging is no longer detected, the value of the slow loop (BL) is reduced by a given value. This value is reduced again each time t+1 at which pinging is not detected.

If the pinging phenomenon is detected again, the fast loop (BR) and the slow loop (BL) are activated again in order once again to correct the ignition advance.

A device capable of managing two settings based on two different octane numbers is also known. If pinging is detected over a certain period of time with a setting based on the octane number of 98, the setting is modified so that it becomes based on the setting for the octane number of 91. When the engine stops, the setting is "reset to zero", which means to say that the setting reverts to the default setting (based on an octane number of 98).

These correction devices are not, however, ideal. Specifically, either they lack performance and finesse regarding the octane number detected, or they are always on the edge of detecting pinging, and this may lead to continued damage to the combustion chamber.

If use is made of an octane number that is lower than the one used for setting up the engine, there is no risk of damaging the engine but engine performance is not optimized.

Now, to date, there is no device that will allow a fairly precise adjustment of the engine setting to suit the octane number of the fuel in order to optimize engine performance.

BRIEF SUMMARY

It is an objective of the invention to allow the engine to be adapted to best suit the octane number of the fuel.

A first aspect of the invention relates to a method of adapting the engine to the octane number of the fuel by incrementing the learned octane number, said method starting out from a reference setting of the ignition advance in an engine operating range for a determined octane number, said reference setting corresponding to a pinging-free (but on the edge of pinging) operation of the engine at a determined speed (N) and a determined torque, the engine operating range being broken down into several zones, each of them comprising an anti-pinging corrective value to be applied to the ignition advance of the reference setting, the method comprising at least the following steps:
- initializing to 0 a top dead center counter (TDC_CTR) upon activation of the method;
- detecting the presence of pinging over a time period t;
- activating an ignition advance angle correction loop if pinging is detected over a time period t;
- decrementing part of the advance correction loop if the presence of pinging is not detected over the time period t+1;
- incrementing the top dead center counter if the advance correction in the current zone is below a threshold specific to that zone;
- incrementing another, zones counter (CTR) in each time period (X ms) by the number of zones in which the advance correction loop is below another threshold specific to each zone;

the crossing of a determined threshold by the top dead center counter or the reaching or crossing of another determined threshold by the zones counter triggering a switch to a reference setting corresponding to a higher octane number.

The top dead center counter is incremented at each top dead center (which represents half an engine revolution in the case of a four-cylinder engine).

The "engine operating range" means a range of values comprised between the abscissa axis representing the engine speed, generally in revolutions per minute (rpm), the ordinate axis representing engine load, generally in Newton meter (N·m), and a curve representing the maximum performance of the engine.

A "reference setting" means the given engine management values including a given ignition advance value for an engine operating range, the setting being given for a determined speed and a determined torque.

Each reference setting may be specific to a given engine operating range, and differ according to the octane number of the fuel. It will thus be understood that the switch to a reference setting also corresponds to a switch to a different engine operating range.

According to one particular embodiment, the correction loop comprises a fast loop (BR) and a slow loop (BL), the incrementing of each counter relying on the values from the slow loop (BL) in the various zones of the engine operating range.

Advantageously, the ignition advance correction loop is reset to zero upon a switch to a reference setting corresponding to a higher octane number.

In a preferred application, the top dead centers counter is reinitialized upon the switch to a reference setting corresponding to a higher octane number.

In particular, the method comprises at least three reference settings.

Advantageously, the reference settings are based on adjustable octane numbers, for example the following octane numbers: 98, 95, 91 and 87.

According to one particular embodiment, at least one ethanol setting, with ethanol numbers E85 and/or E100, may be added.

According to one particular embodiment, each reference setting comprises at least four zones and advantageously at least sixteen zones.

Advantageously, the engine operating range for each reference setting comprises at least 18 zones.

A first zone, hereafter known as zone 0, requiring no corrective value to be applied to the ignition advance, the risks of pinging being deemed to be sufficiently low.

An extreme zone, hereafter known as zone 17, in which it is difficult to detect engine pinging, and for which the pinging correction value from the previous zone will be applied.

The next zones are called zone 1 to zone 16 and each comprise an initial anti-pinging corrective value, as well as two thresholds associated with the switch to a higher octane number.

BRIEF DESCRIPTION OF THE DRAWINGS

The invention is now described with reference to the non-limiting drawings, in which.

DETAILED DESCRIPTION

Figure 1:
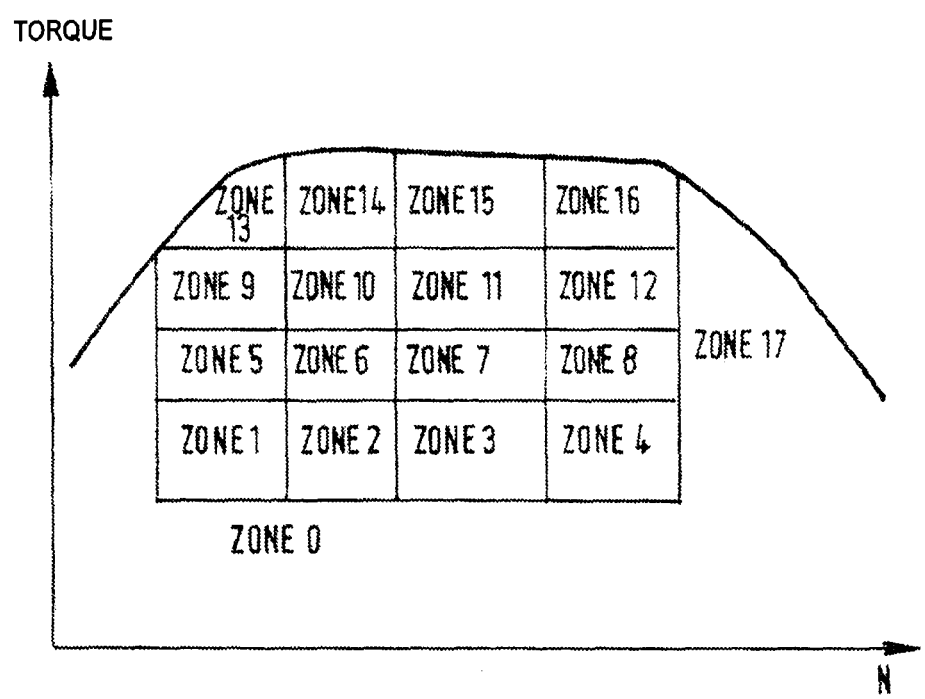
FIG. 1 depicts the engine operating range of a vehicle.

FIG. 1 depicts the engine operating range of a vehicle, in which the abscissa axis represents the engine speed N in revolutions/minute and the ordinate axis represents the engine load, also known as torque, in N·m. The curve represents the maximum performance of the engine.

In this figure there is a grid made up of 18 zones numbered from 0 to 17.

Zone 0, determined as being below a particular torque, does not require any particular ignition advance setting because the phenomenon of pinging is rare and therefore carries little risk of damaging the combustion chamber.

In zone 17, which is determined as being above a given speed, it becomes difficult to detect pinging. The corrective value from the previous zone crossed is therefore applied here.

Zones 1 to 16 each comprise a slow loop (BL) anti-pinging corrective value to be applied to the ignition advance.

For example, zone 1 may have a corrective value (BL_1) of 2°, zone 2 a corrective value (BL_2) of 5°, zone 3 a corrective value (BL_3) of 4°, zone 4 a corrective value (BL_4) of 1°, and so on.

During engine operation, passage through zone 1 will therefore allocate an ignition advance of 29°, corresponding to the reference setting of 31°, minus a corrective value of 2° corresponding to the corrective value for zone 1. If the engine enters zone 2, the ignition advance will be 35°, corresponding to the 40° of the reference setting, minus 5° corresponding to the corrective value for zone 2. These various corrective values need to correct the ignition advance in order to obtain pinging-free operation.

However, the pinging phenomenon is not always eradicated, particularly if the fuel chosen has a lower octane number.

For each pinging phenomenon, and irrespective of the zone concerned, an ignition advance correction loop, usually comprising a fast loop (BR) and a slow loop (BL) is activated. Thus, for each pinging phenomenon, the slow loop (BL) is incremented by a predetermined value. As an example, it will be considered that the fast loop (BR) applies a correction of 4° and the slow loop (BL) a correction of 2°, to each pinging phenomenon. If the pinging phenomenon is no longer detected, the slow loop (BL) is degressive over time by a predetermined value. As an example, it will be considered that for each time t+1, the value will decrease by one quarter of its initial value, namely by 0.5°.

This then yields the following operation: when entering zone 1, the overall value determined above, namely 31°-2° is applied. If pinging is detected, the fast loop (BR) value of 4° and the slow loop (BL) value of 2° are taken away. This then gives an ignition advance setting of 31°-4°-2°, namely of 25°. At a time t+1, if the pinging phenomenon is no longer present, the slow loop value is decremented, in this example by 0.5°. Thus, at a time t+1, a corrective value will be 29.5°, and at a time t+2 a corrective value will be 30°, and so on. When a pinging phenomenon is detected again, the correction loop is activated once again. One might therefore reach a time t+3 where pinging is detected, the previous corrective value being 30°, and the value of BR+BL, namely 4°+2° are taken away from that. That then yields an ignition advance setting of 24°.

Figure 2:
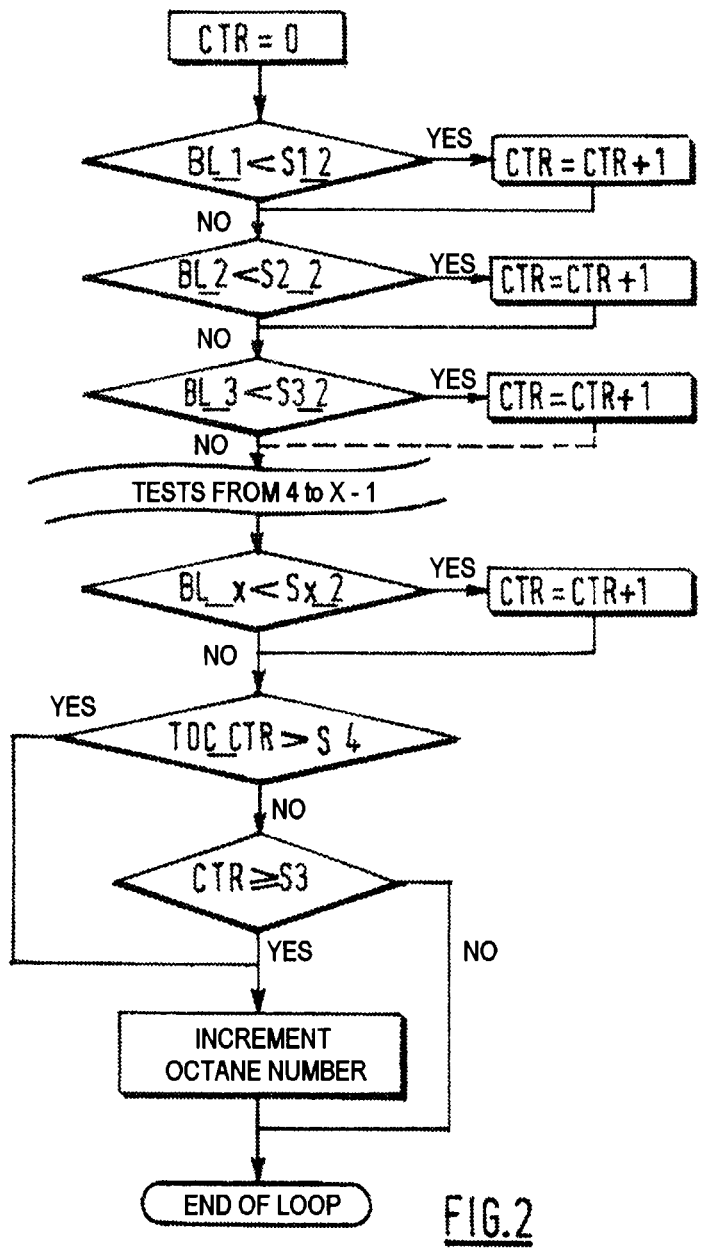
FIG. 2 is a diagram of the adaptation method according to the invention.

The invention relies on two modes of switching to a reference setting corresponding to a higher octane number, these being illustrated by the diagram of FIG. 2.

The first relies on the fact that at each top dead center (half an engine revolution for a 4-cylinder engine), as soon as the slow loop (BL) of the current operating zone drops below a threshold specific to that zone, a counter (TDC_CTR) is incremented. This counter has a threshold value (S4) which, when crossed, causes the switch to a reference setting corresponding to a higher octane number.

The second relies on the fact that for every X ms (for example X=100), the number of zones in which the slow loop correction is below a threshold specific to this zone is counted. To do that, use is made of a counter (CTR) which is initialized at 0 every X ms before counting the zones. This counter has a threshold value (S3) which, once reached or crossed, causes a switch to a reference setting corresponding to a higher octane number.

In our example, we shall take the value of 1000 as being the threshold value S4 for the top dead centers counter for the first switching mode.

Figure 3:
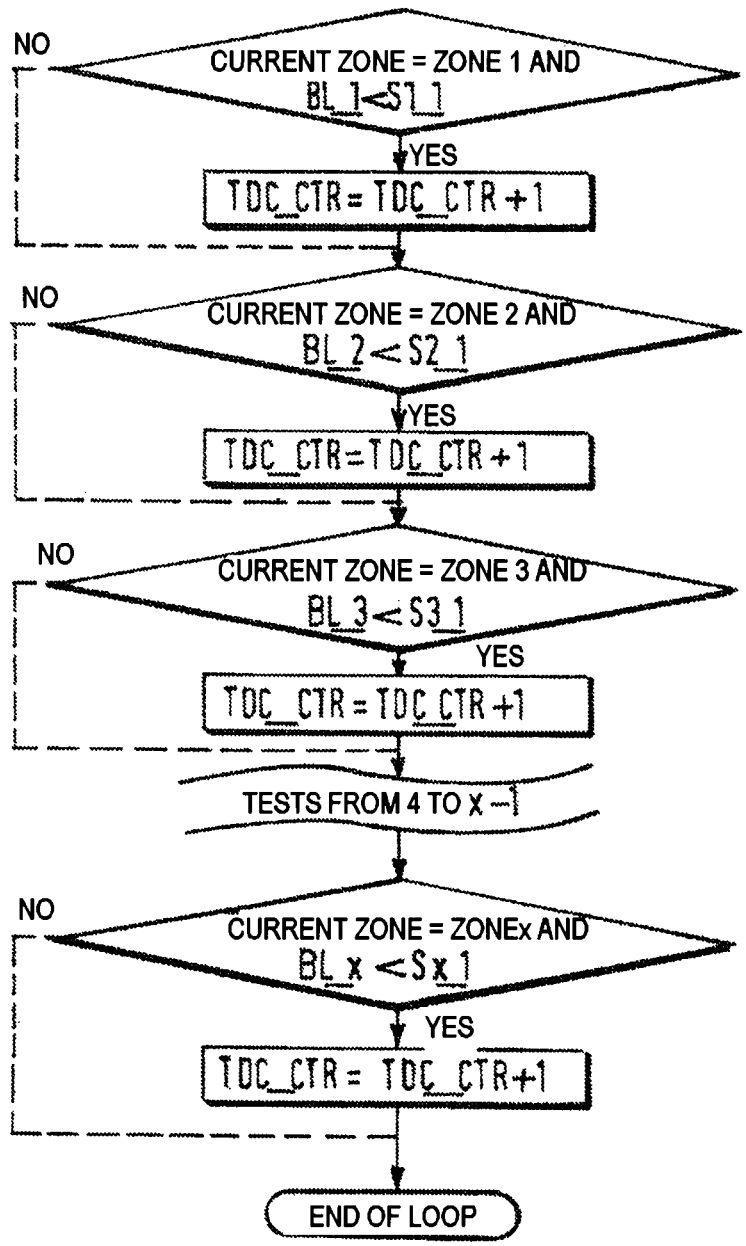
FIG. 3 is a diagram of the loop for implementing the top dead centers counter, which is done at each top dead center, and the final value of which is used in the diagram of FIG. 2 for the condition TDC_CTR>S4.

According to this first switching mode, the counter TDC_CTR is initialized to 0 upon activation of the method. As long as the current operating zone is other than zone 1 to 16, or as long as the slow loop (BL) ignition advance correction in the current zone is above a threshold specific to that zone, the counter is not incremented. At each top dead center (half an engine revolution for a 4-stroke 4-cylinder engine), the slow loop (BL) value of the zone is tested against the threshold for that zone, as illustrated by the diagram of FIG. 3 in which "x" represents the number of zones.

For example, at top dead center n, in zone 1, if the slow loop (BL) for zone 1 (BL_1) is below the threshold S1_1 defined in this zone, the counter TDC_CTR is incremented by 1. At the top dead center n+1, still in this zone, and with no pinging phenomenon having been detected since top dead center n, the slow loop therefore still remains below the threshold S1_1. The counter TDC_CTR is therefore incremented again.

If at top dead center n+2 the engine enters a different zone, for example zone 2, in which the slow loop (BL_2) is below the threshold S2_1 for this zone, the counter TDC_CTR is incremented. If pinging is detected in this zone between top dead centers n+2 and n+3, the value of the slow loop is then incremented. For example, if it then crosses the threshold S2_1, then at top dead center n+3 the counter TDC_CTR is not incremented. The method continues in this way as long as the engine is running. When the top dead center counter TDC_CTR crosses the threshold S4, the method then switches to a reference setting corresponding to a higher octane number.

When the switch to the higher octane number is made, the top dead center counter is reinitialized (TDC_CTR=0).

The method also has a condition on the level of slow loop (BL) ignition advance correction across a set of zones. A slow loop correction threshold is associated with each zone and, when reached across a number of zones defined by the threshold S3, causes a switch to a reference setting corresponding to a higher octane number.

In our example, we shall adopt the value of 6 as being the threshold value S3 for the number of zones for the second switching mode.

For example (see FIG. 2), every X ms (for example X=100), the number of zones for which the slow loop correction threshold is not reached is counted. At the instant t, the counter CTR is initialized (CTR=0). If the slow loop correction (BL_1) for zone 1 is below a threshold S1_2, the counter CTR is incremented. If the slow loop correction (BL_3) for zone 3 is above a threshold S3_2, the counter CTR is not incremented. The method continues in this way for zones 1 to 16. The value of this counter is then compared against a number of zones threshold S3. In our example, if this counter CTR reaches or exceeds 6, the engine is switched to a higher reference setting, for example undergoes a transition from the octane number setpoint SP95 to an octane number setpoint SP98.

After the switch to a higher reference setting, either brought about by the multizone threshold (S3) or by the condition placed on the number of top dead centers (S4), a check is carried out to ensure that operation at this setting is optimum for a determined length of time. If the setting is correct, the new setting continues to be applied, but if not, the method drops back down to the lower setting. If it has been necessary to drop back down to the lower setting, then no further attempt to go up to a higher setting is made until the addition of fuel has been detected.

In other words, the absence of pinging for a given number of engine revolutions, or a very low level of correction from the anti-pinging slow loop (BL) over a plurality of zones of the engine operating range, brings about a switch to a higher setting. If operation is deemed to be correct, notably in terms of the pinging detected with this setting, the engine is stabilized on the current setting. If not, the method drops back down to the previous setting.

The invention claimed is:

1. A method of automatically adapting an engine to an octane number of fuel by incrementing a learned octane number in an electronic engine controller, the method starting out from a reference setting of an ignition advance in an engine operating range for a determined octane number, the reference setting corresponding to a pinging-free operation of the engine at a determined speed and a determined torque, the operating range of the engine being broken down into plural zones, each of the zones including an anti-pinging corrective value to be applied to the ignition advance of the reference setting, the method comprising:
   initializing to zero a top dead center counter of the electronic engine controller upon activation of the method;
   detecting a presence of pinging in the engine over a first time period;
   activating an ignition advance angle correction loop of the electronic engine controller if pinging is detected over the first time period;
   decrementing a value of part of the ignition advance angle correction loop if pinging is not detected over a second time period;
   incrementing the top dead center counter if the ignition advance angle correction loop in the current zone is below a first threshold specific to that zone;
   incrementing a multizone counter of the electronic engine controller in each time period by a number of the zones in which the ignition advance angle correction loop is below a second threshold specific to each zone;
   switching the electronic engine controller to a reference setting corresponding to a higher octane number when a determined top-dead-center count threshold is crossed by the top dead center counter; and
   switching the electronic engine controller to the reference setting corresponding to the higher octane number when a determined multizone threshold is reached or crossed by the multizone counter; and changing the ignition advance based on the reference setting.

2. The method as claimed in claim 1, wherein the ignition advance angle correction loop comprises a fast loop and a slow loop, the incrementing of each counter relying on the value from the slow loop in each of the various zones of the engine operating range.

3. The method as claimed in claim 1, wherein the ignition advance angle correction loop is reset to zero upon the switch to the reference setting corresponding to the higher octane number.

4. The method as claimed in claim 1, wherein the top dead center counter is reinitialized upon the switch to the reference setting corresponding to the higher octane number.

5. The method as claimed in claim 1, comprising at least three reference settings.

6. The method as claimed in claim 5, wherein the reference settings are based on adjustable octane numbers.

7. The method as claimed in claim 1, wherein each reference setting comprises at least four zones.

8. The method as claimed in claim 1, wherein each reference setting comprises at least sixteen zones.

9. The method as claimed in claim 1, wherein each reference setting comprises eighteen zones, including
- a lowest zone, wherein no corrective value is applied to the ignition advance, and
- an extreme zone, wherein a pinging correction value from an immediately previous zone is applied.

10. The method as claimed in claim 1, wherein at least one of the reference settings is an ethanol setting.

\* \* \* \* \*